Feb. 28, 1961 A. J. MORWAY ET AL 2,973,321
PROCESS OF MAKING AN IMPROVED CARBOXYLIC ACID
SALT COMPLEX THICKENED LUBRICANT
Filed Jan. 16, 1957
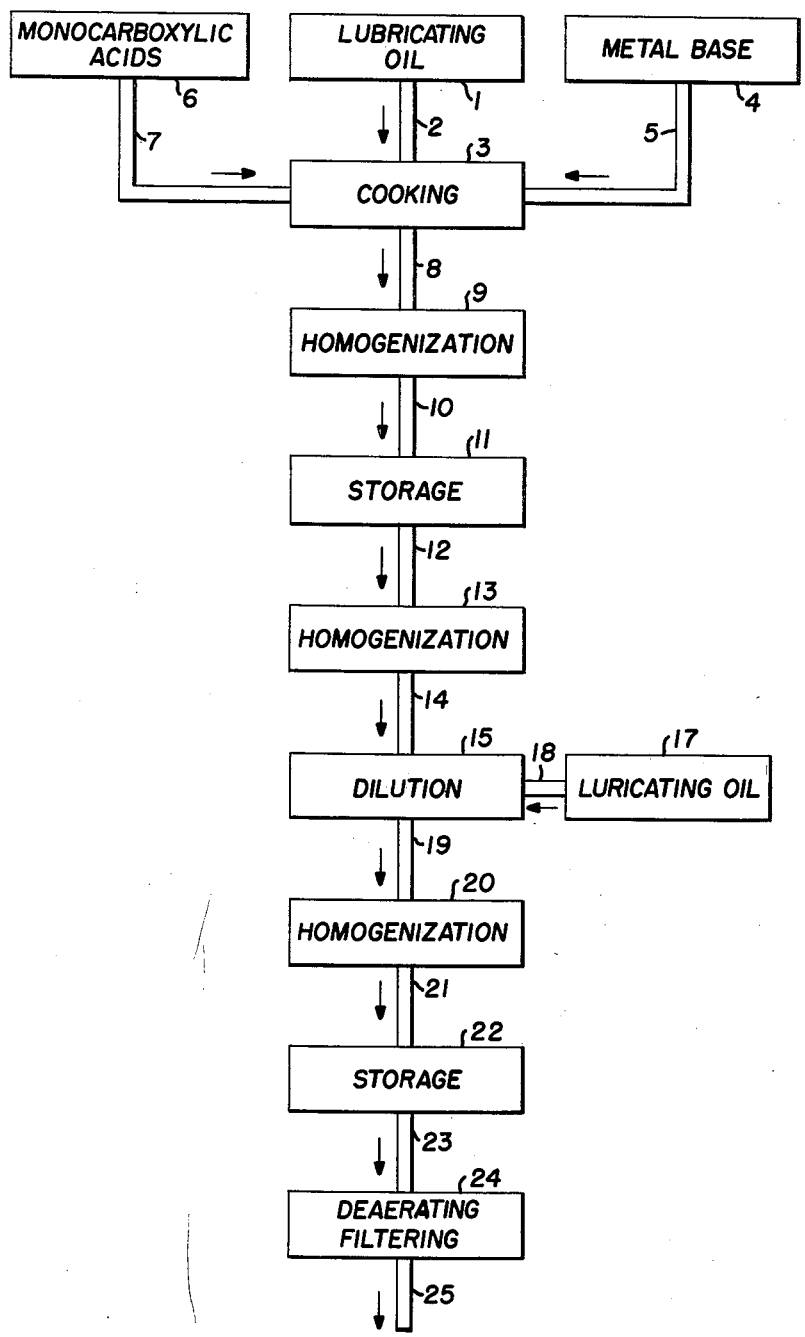
Arnold J. Morway
Cloyce R. Daniels    Inventors
Robert P. Spray
By L. a. Strimbeck   Attorney

United States Patent Office 2,973,321
Patented Feb. 28, 1961

2,973,321
PROCESS OF MAKING AN IMPROVED CARBOXYLIC ACID SALT COMPLEX THICKENED LUBRICANT

Arnold J. Morway, Clark, N.J., and Cloyce R. Daniels, Bridgeville, and Robert P. Spray, Pittsburgh, Pa., assignors to Esso Research and Engineering Company, a corporation of Delaware Filed Jan. 16, 1957, Ser. No. 634,450
3 Claims. (Cl. 252—39)

The present invention is concerned with a process for preparing a fluid lubricating composition thickened with the metal salts of acetic acid and intermediate molecular weight monocarboxylic acids.

In brief compass, this invention proposes an improvement of a process wherein a fluid lubricating composition is formed at a temperature in the range of 250° to 340° F., by dispersing in a lubricating oil having an initial viscosity in the range of 55 to 100 SSU at 210° F. and a viscosity index in the range of 40 to 100, the metal salts of an acetic acid and of an intermediate molecular weight monocarboxylic acid having from 7 to 12 carbon atoms, the molecular ratio of acetic acid to intermediate molecular weight acid being in the range of 10:1 to 25:1.

The improvement of this invention comprises maintaining the weight percentage of the metal salts in the composition in the range of 20 to 50, homogenizing or shearing the composition at a temperature in the range of 80° to 150° F., at a shearing force in the range of 100,000 to about 500,000 or more reciprocal seconds, sufficient to assure that the composition has a good storage stability as indicated by no tendency to separate solids when stored at 100° F. for at least 40 days. The homogenized composition is then diluted with further amounts of the lubricating oil until the weight percentage of the metal salts in the composition is in the range of 4 to 10, and further homogenized at a temperature in the range of 80° to 150° F. and a shearing force in the range of 100,000 to 750,000 or more reciprocal seconds, sufficient to assure that the composition gives less than 5.0 wt. percent separation of solids in the centrifuge test. In this manner there is obtained a fluid product of improved stability. The resultant product is non-Newtonian and viscosity per se is not a true measure of its consistency, but it has an approximate viscosity in the range of 80 to 150 SSU at 210° F.

It has been known to thicken oils with a complex formed from low molecular and intermediate molecular weight monocarboxylic acid salts. The ratio of low molecular weight acid to intermediate molecular weight acid has usually been in the range of 2:1 and 25:1. The metal salts are prepared by well known means such as preforming, e.g., in a volatile solvent; by neutralization of the acids with metal bases such as calcium hydroxide. Such thickened oils are desirably anhydrous.

The fluid lubricating compositions prepared from such metal salt complexes, however, have not been as stable as desired, particularly when the ratio of the low molecular weight acid to the intermediate molecular weight acid is greater than 10:1. The thickener tends to settle out of the fluid composition and this is highly undesirable.

It has now been discovered that a very stable fluid composition, thickened with such metal salt complexes, can be prepared by careful treatment of the metal salt-oil composition after it has been formed. The treatment of this invention involves homogenization or shearing of the concentrated metal salt solution followed by dilution, and then further homogenization to arrive at a stable structure.

This method of dual homogenization, i.e., homogenization at high metal salt content-dilution-homogenization at low metal salt content, appears to be unique to this type of thickener as equivalent results are not obtained with other conventional types of thickeners known to the prior art, such as conventional fatty acid soaps, complex soaps formed from low molecular weight ($C_1$–$C_3$) salts/high molecular weight ($C_{12}$–$C_{20}$) soaps, etc.

The fluid lubricating composition of this invention is particularly useful as a marine diesel cylinder lubricant. It gives trouble-free operation and results in extremely low wear. It also satisfactorily answers the problem of lubricator life that is associated with marine diesel engines. The lubrication to a marine diesel is metered through a lubricator that has a sight-glass filled with a mixture of glycerine and water. The oil is passed dropwise through the sight-glass. Most oils of this type result in rapid clouding or displacement of the sight-glass fluid with the oil being metered, whereas the oil of the present invention has a Manzel lubricator life of over 40 days.

The following description of this invention with reference to the attached flow sheet, which forms a part of this specification, will serve to make the invention clear.

The lubricating oil which is thickened can be generally of any type known to the prior art, having a viscosity of about 60 to 10,000 SSU at 100° F. and about 55 to 100 SSU at 210° F. It is preferred that the lubricating oil have an initial pour point of about +20° to —75° F., and a flash point of about 350° to 650° F. Best results are obtained with a lubricating oil having an initial viscosity index in the range of 40 to 100. Synthetic as well as mineral lubricating oils can be employed as part or all of the liquid phase of the lubricating composition. They include synthetic lubricating oils of the hydrocarbon, hydrocarbon polymer, ester, complex ester, formal, mercaptal, polyalkene oxide, silicone and similar types. Synthetic oils such as the di-2-ethylhexyl sebacate, di-$C_8$-Oxo azelate, di-$C_{10}$-Oxo-azelate or complex esters of glycols, dicarboxylic acids and alcohols or monocarboxylic acids can be used.

The low molecular weight monocarboxylic acid used is acetic. The intermediate molecular acids used have from 7 to 12 carbon atoms per molecule. The mixtures used preferably average about 10 carbon atoms per molecule. Either saturated or unsaturated fatty acids may be utilized although the saturated acids are preferred. Straight chain or substantially straight chain configuration is also preferred. The average saponification value of the single or mixed intermediate molecular weight acids is preferably in the range of 310 to 440, more preferably 320 to 380. Examples of such acids are 5-methyl-2-hexanoic, heptanoic, octanoic, nonanoic, decanoic. Commercial mixtures of these intermediate molecular weight carboxylic acids having an average saponification number of about 320 to 380 are particularly preferred. The Oxo acids prepared by the well known Oxo synthesis can also be used. This method of preparation is described in U.S. 2,537,577 and U.S. 2,553,364.

As indicated above, the acetic acid to the intermediate molecular weight acid ratio is in the range of 10:1 to 25:1. The final product contains 4–10 wt. percent of the mixed metal salts. At concentrations below this, the wear reducing benefits of the composition are not obtained and in concentrations above this, sedimentation or solidification becomes a problem.

The metals used in forming the salts are preferably alkaline earth metals such as calcium, strontium, magnesium or barium, calcium being particularly preferred. Other conventional grease-forming metals can be used.

This invention is concerned with the improvement of the organic metal salt-oil blend after it has been formed. This oil-metal salt mixture can be formed in any convenient manner. The mixed acids may be co-neutralized in situ in the oil if desired. This is particularly desirable in cases in which the salts have the same metal constituent. The mixture of metal salts can also be prepared by separately preforming the salts in aqueous media and then dehydrating. They also can be formed separately in volatile solvents with removal of the solvent before the metal salts are added to the lubricating oil. It is important that the final composition arrived at be substantially anhydrous. This is done by cooking the oil containing the metal salts at a temperature in the range of 250° F. to 350° F. until the water content is below 0.5 wt. percent.

A particularly preferred method of manufacturing the starting material used in this invention, when using lime to form the salts, is to add the lime in two portions. Commercial hydrated lime can contain up to 5% of calcium carbonate which is not too reactive and generally causes excess alkalinity in the final product. This carbonate forms sediment in sight-glasses and in some manner imparts greater viscosity to the finished lubricant.

When all of the lime is added at one time, the acids are taken up by reaction with the hydrated lime. By employing a slight (2–5%) deficiency in the amount of lime first added, the excess acid, particularly the acetic acid, will then react with the calcium carbonate and remove it. The small amount of remaining excess acid is then neutralized with a second addition of hydrated lime. Thus the carbonate is kept to a very small amount in the final lubricant. The second addition of lime can be made after the initial saponification is complete and the mixture is hot (200°–225° F.), and preferably after a determination of free acidity has been made. It is desirable to adjust the free alkalinity at this point because higher temperatures would volatilize the free acetic acid. Also it is desirable that the second addition of lime be sufficient to make the lubricant slightly alkaline.

After being prepared, the oil so obtained containing the metal salts in an amount in the range of 20 to 50 wt. percent, is then treated according to the method of this invention.

EXAMPLE 1

With reference to the attached flow sheet, the commercial manufacture of a fluid lubricating composition according to the method of this invention will be described. The following ingredients were used:

| Ingredients | Wt. percent |
|---|---|
| Glacial acetic acid | 20.0 |
| Intermediate Molecular Weight Acid | [1] 4.8 |
| Hydrated Lime | 14.8 |
| Phenyl alphanaphthylamine | 0.6 |
| Lubricating Oil | [2] 59.8 |

[1] The intermediate molecular weight acid was a commercially available acid having approximately the following composition:

| | Percent |
|---|---|
| Caprylic acid | 28.0 |
| Capric acid | 56.0 |
| Lauric acid | 16.0 |

[2] The lubricating oil was obtained by hydrofining of a coastal distillate and had the following inspections:

| | |
|---|---|
| A.P.I. Gravity | 21.0° min. |
| Color | 3–4 (N.P.A.) |
| Flash—Open Cup | 440° F. min. |
| Pour point | 15° F. max. |
| Viscosity@100 SSU | 1200–1250. |

7,600 pounds of the mineral oil from source 1 were admitted by line 2 to a steam-jacketed 18,000 lb. capacity kettle 3 equipped with scraper blades. 1,776 pounds of hydrated lime from source 4 were admitted by line 5 to kettle 3. A smooth uniform slurry was formed. While slowly mixing (paddle speed 17 r.p.m.), there was added a mixture of the acetic acid and intermediate molecular weight acid from source 6 via line 7 at approximately 30 lbs. per minute. After complete addition of the mixed acids, the product was mixed at top paddle speed (34 r.p.m.) for about two hours. The mass was then heated to 320° F. and held at this temperature for two hours to dehydrate it (0.2–0.5% water). The phenyl alpha naphthylamine was then added, the mixture was cooled by passing cold water to the kettle jacket, and diluted with 1200 gallons of the lubricating oil. The mixture was cooled to 150° F. and formed a semi-solid grease. This grease was then pumped by line 8 through a homogenization zone 9 comprising a model G-125 Charlotte mill set at 0.004 inch clearance. The homogenized mixture was then transferred by line 10 to a 36,000 lb. storage tank 11. The sulfated ash and free alkali of the base at this time were: Sulfated ash, 15.82 wt. percent and free alkali as NaOH, 0.50 wt. percent.

From storage 11 the grease was passed by line 12 to a homogenization zone 13 comprising a model G-125 Charlotte mill set at 0.004 inch clearance. After this homogenization, the material was passed by line 14 to a 70,000 lbs. storage tank 15 equipped with a side entrance mixer. In this tank the homogenized material was diluted to the desired soap content, with additional lubricating oil supplied from zone 17 via line 18 as measured by a sulfated ash ($CaSO_4$) of 5.5 to 5.8%. After addition of 6,210 additional gallons of the lubricating oil, the sulfated ash was 5.5 wt. percent, and the material had a viscosity of 1766 SSU at 100° F. and 132 SSU at 210° F.

After dilution, the mixture was passed by line 19 to a third homogenization zone 20 comprising a model 75 Charlotte mill set at 0.004 inch clearance. The thrice-homogenized material was then transferred by line 21 to another 70,000 lb. storage tank 22. From this storage tank the product was withdrawn by line 23 through a final treatment zone 24 comprising a Cornell deaerator and a Purolator filter set at 0.008 inch spacing, equivalent to approximately a 60 mesh screen. From this final zone 24, the material was passed by line 25 to packaging in 430 lb. drums. The approximate yield was 140 drums.

Table I gives the analysis and inspections of the lubricating oil composition so formed, and also gives the preferred inspections limits for the product of this invention.

Table I

| Tests | Desired Specifications | | This Invention |
|---|---|---|---|
| | Minimum | Maximum | |
| Viscosity, SSU@100° F | 1,700 | 1,900 | 1,766 |
| Viscosity, SSU@210° F | 125 | 145 | 132 |
| Sulfated Ash, Percent | 5.5 | 5.8 | 5.5 |
| Centrifuge Test, Wt. Percent Solids 4 Hours at 1,500 r.p.m | | 5 | 2.2 |
| Screen Test (40 Mesh) | ([1]) | ([1]) | Pass |
| Free Alkalinity, Percent | 0.05 | 0.30 | 0.15 |
| Water by Distillation, Percent | | 0.2 | 0.15 |
| 4 Ball Wear Test, Scar Spot Diameter mm. (1,800 r.p.m.—10 Kg. Load—75° C., 1 hour) | | | 0.20 |

[1] No lumps, jelly or dirt.

The composition of this invention results in a product that has a separation of less than 5 wt. percent of solids when centrifuged (with no dilution with ASTM naphtha) for four hours at 1500 r.p.m. and 120° F. in the centrifuge test for stability, using the centrifuge and cone-shaped centrifuge tubes described in ASTM B–91–40, Standard Method of Test Precipitation No. of Lubricating Oils.

The screen test comprises fitting a four-inch, 40-mesh screen (of any suitable material) to a Büchner funnel. The four-inch screen is weighed and placed in the funnel, then without using a suction, one quart of the lubricant is passed through the screen at a temperature of about 75° F. After filtering of the sample is complete, the screen is allowed to drain for 15 minutes and then is wiped off on the bottom and reweighed. The screen is examined for lumps, jelly, crystals and dirt. Weights in excess of about 0.5 gram indicate the presence of jelly and possibly water.

The free alkalinity is determined by ASTM Methods of Analysis of Grease (D-128-47).

The sulfated ash test is according to ASTM D-874-51; Method of Test for Sulfated Residue From New Lubricating Oils.

Water content is determined by ASTM D-95-46, Method of Test for Water in Petroleum Products and Other Bituminous Materials.

The viscosities are determined according to ASTM D-445-46 using Ubbelohde viscosity tubes, size No. 3.0 for the 100° F. determination and size No. 0.3 for the 210° F. determination. With one filling of the viscosity tube, four successive determinations are made, the first one being discarded because the lubricant is non-Newtonian. The average of the last three runs is the viscosity used.

The four ball wear test scar spot indicates the excellent anti-wear resistance of the lubricant of this invention. Friction and wear is determined in this test by the precision-shell four ball wear tester described in a United States Steel Lubricants Testing Laboratory, National Tube Division, Report, November 1, 1952.

The conditions are:

1800 r.p.m.   1 hr. duration
75° C.        10 kg. load

The term "homogenization" is intended to include any method of subjecting the lubricant to shearing forces. Besides the colloidal mill (Charlotte mill) identified, this milling can be carried out using the Gaulin homogenizer made by Manton-Gaulin Company, the Morehouse mill made by Morehouse Industries, or any device capable of imparting rates of shear approaching 100,000 to 750,000 reciprocal seconds or more. The homogenization of the concentrated (20-50 wt. percent salts) metal salt composition should be carried out to an extent sufficient so that there is no particle size above 500 microns, and the average particle size is 300 microns under microscopic scanning. The second homogenization is carried out to an extent sufficient so that the material will pass the centrifuge test above described and completely pass through the 0.008 inch filter spacings. While the temperature of homogenization does not appear to be critical, it is desirably in the range of 80 to 150° F. in order to obtain best results.

The deaeration step is greatly desired because a lubricant, when employed as an upper cylinder lubricant in marine diesel engines, is passed through a lubricator (e.g., a Manzell lubricator) that acts as a displacement pump. Any air entrained in the lubricant can cause vapor lock in the dispensing pump or lines. Prior art preparations give relatively short lubricator lives. However, the product of this invention has more than tripled lubricator life.

EXAMPLE II

The following data show that it is important that the final product contain at least about 4 wt. percent of the complex metal salts. Greases were prepared in a manner similar to that described above, having various metal salt contents, and were tested according to the four-ball wear test described above. The scar spot diameters obtained vs. the percent sulfated ash in the lubricant are given in the following Table II.

Table II

| Percent Sulfated Ash of Lubricating Oil | Scar Spot Diameter, mm. |
| --- | --- |
| 0 | 0.60 |
| 1.57 | 0.54 |
| 3.13 | 0.50 |
| 4.71 | 0.22 |
| 6.27 | 0.20 |

EXAMPLE 3

Three lubricants were made up according to this invention having the composition given in Table III.

Table III

| Formulation (Wt. Percent) | Base A | Base B | Base C |
| --- | --- | --- | --- |
| Glacial Acetic Acid | 20.0 | 20.0 | 20.0 |
| Intermediate Mol. Wt. Acids | 4.8 | 4.8 | 4.8 |
| Hydrated Lime | 14.8 | 14.8 | 14.8 |
| Phenyl Alpha Naphthylamine | 0.6 | 0.6 | 0.6 |
| Acid Treated Lubricating Oil | 59.8 | | |
| Hydrofined Lubricating Oil #1 | | 59.8 | |
| Hydrofined Lubricating Oil #2 | | | 59.8 |

FINISHED LUBRICANT

| | A | B | C |
| --- | --- | --- | --- |
| Glacial Acetic Acid | 4.46 | 4.46 | 3.62 |
| Intermediate Mol. Wt. Acids | 1.18 | 1.18 | .87 |
| Hydrated Lime | 3.30 | 3.30 | 2.68 |
| Phenyl Alpha Naphthylamine | 0.13 | 0.13 | .11 |
| Acid Treated Lubricating Oil | 90.93 | | |
| Hydrofined Lubricating Oil #1 | | 90.93 | |
| Hydrofined Lubricating Oil #2 | | | 92.72 |

The intermediate molecular weight acids were the commercially available acids referred to in Example I.

The lubricating oils were derived from a naphthenic coastal crude. The oil for the composition A was obtained by treating this fraction with sulfuric acid. The three oils had inspections listed in Table IV.

Table IV

| | Diol 80 Acid Treated | Diol 80 Hydrofined #1 | Diol 65 Hydrofined #2 |
| --- | --- | --- | --- |
| Viscosity @ 100° F., SSU | 1,200 | 1,200 | 750 |
| Viscosity @ 210° F., SSU | 80 | 80 | 65 |
| Gravity, ° API | 21.0 | 21.0 | 21.5 |
| Flash, open cup, ° F. min | 440 | 440 | 410 |
| Pour Pt., ° F | | 15.0 max. | |

The compositions were made up as follows: A steam jacketed fully scraped kettle was charged with 5980 lbs. of a lubricating oil and 1480 lbs. of lime. These were mixed to form a smooth slurry. To the slurry was added a blend of 480 lbs. of the intermediate molecular weight acid and 2000 lbs. of acetic acid at a rate of 34 lbs. per minute. This addition was done through a top opening in the kettle while the paddles were rotating at 17 r.p.m. After addition of the acid, the temperature rose to 205° F. Stirring was continued for 30 minutes with the paddles at 34 r.p.m. Steam was then passed into the kettle jacket and the temperature raised to 320° F. The heating was then discontinued and cooling water was passed through the kettle jacket. During this cooling, 10,500 lbs. of additional lubricating oil were added. The phenyl alpha naphthylamine was added and the grease at a temperature of 239° F. was left to cool overnight. The paddle and the cooling water were shut off.

The next day the grease was passed through a Charlotte mill set at 0.004 inch clearance. After this homogenization it was stored in a 36,000 lb. storage tank at 88° F. Approximately 7000 lbs. of this intermediate cutback material was then returned through the Charlotte mill to the kettle for final dilution. The twice-homogenized intermediate cutback material was diluted to the desired ash content and then again passed through the mill. After this it was deaerated in a Cornell deaerator and filtered in a Purolator filter using a 0.015 inch mesh screen. It was then packaged. The balance of the intermediate cutback material from the storage tank was handled similarly. The yield for each of the three compositions A, B and C was approximately 130 drums (432 lbs. each).

The trend toward the use of low-cost residual type fuels in the large slow-speed marine engine has created an important quality problem in the field of marine diesel cylinder oils. The use of residual fuels in marine engines has resulted in increased liner wear from 50 to 500% above the wear experienced with distillate fuels. Because, however, of the differential price of over $1.50 per barrel, a tanker can realize a large gross annual fuel saving of around $100,000 by using bunker fuel in place of distillates.

The lubricating composition of this invention is particularly directed to this problem of lubricating marine diesel engines. This composition differs somewhat from the conventional mineral oil distillates previously used in that it is a fluid grease and resembles most greases in appearance, although it still is free-flowing.

The major function of a diesel cylinder lubricant is to reduce friction and wear of the piston rings and liner surfaces. This is done by injecting the lubricant into each cylinder and it is, in a large measure, consumed during fuel combustion. The increased liner wear experienced with residual fuels is believed to be mainly due to corrosion which results from the high sulfur content of residual fuel and the abrasive action of the products of incomplete combustion of the heavy fuel components. Residual fuels usually range in sulfur content from 2 to 4%, while distillates generally fall under 1.5%.

Composition A of Example 3 was tested in a residual fuel burning motor ship "Esso Little Rock," an 18,000 ton tanker powered by a five cylinder 75,000 H.P., two-cycle, single-acting, opposed piston, Sun-Doxford engine. For purposes of comparison, a high quality, premium control oil was used. This was a deasphalted, phenol treated and solvent extracted residuum from a blend of paraffinic crudes having a viscosity of 85 SSU at 210° F. and a viscosity index of 101.

After approximately 5200 hours of operation, the total wear in the cylinders lubricated with the control oil was 0.1 inch. After the same period of operation on composition A, the wear was only 0.057 inch. Thus a reduction of 43% was obtained. Other tests with the other compositions, B and C, of Example 3 have shown that as compared to distillate lubricating oils and to detergent lubricating oils, the composition of this invention results in decreasing liner wear from anywhere from 50 to 83% or more.

Having described this invention, what is sought to be protected by Letters Patent is succinctly set forth in the following claims.

What is claimed is:

1. In a process wherein a substantially anhydrous fluid lubricating composition is formed at a temperature in the range of 250 to 340° F. by dispersing in a mineral lubricating oil having an initial viscosity in the range of 55 to 100 SSU at 210° F. and a viscosity index in the range of 40 to 100, the metal salts of acetic acid and of an intermediate molecular weight monocarboxylic acid having from 7 to 12 carbon atoms, the molecular ratio of low molecular weight acid to intermediate molecular weight acid being in the range of 10:1 to 25:1, the improvement which comprises maintaining the wt. percent of said metal salts in said composition in the range of 20 to 50, homogenizing the composition at least twice at a temperature in the range of 80 to 150° F. and at a shearing force in the range of 100,000 to 500,000 reciprocal seconds, diluting the composition so homogenized with further amounts of said lubricating oil until the weight percentage of said metal salts is in the range of 4 to 10 and then further homogenizing the diluted composition at a shearing force in the range of 100,000 to 750,000 reciprocal seconds and a temperature in the range of 80 to 150° F. to obtain a fluid product of improved stability having a viscosity in the range of 80 to 200 SSU at 210° F.

2. The process of claim 1 wherein said metal is calcium.

3. A process which comprises forming at a temperature in the range of 250° to 340° F., a substantially anhydrous mixture of 20 to 50 wt. percent of the calcium metal salts of acetic acid and a monocarboxylic acid having from 7 to 12 carbon atoms in a liquid lubricating oil, the ratio of acetic to said monocarboxylic acid being in the range of 10:1 to 25:1, subjecting said mixture to shearing at least twice at a temperature in the range of 80° to 150° F. and at a shearing force in the range of 100,000 to 500,00 reciprocal seconds, diluting the mixture with additional lubricating oil to a metal salt content in the range of 4 to 10 wt. percent, and then further shearing the diluted mixture at a temperature in the range of 80° to 150° F. and a shearing force in the range of 100,000 to 750,000 reciprocal seconds to obtain an improved fluid lubricating composition.

References Cited in the file of this patent

UNITED STATES PATENTS

| | | |
|---|---|---|
| 1,458,542 | Plauson | June 12, 1923 |
| 2,412,680 | Fisher et al. | Dec. 17, 1946 |
| 2,704,363 | Armstrong | Mar. 15, 1955 |
| 2,734,030 | Forster et al. | Feb. 7, 1956 |
| 2,735,815 | Morway | Feb. 21, 1956 |
| 2,739,127 | Morway et al. | Mar. 20, 1956 |
| 2,758,973 | Morway et al. | Aug. 14, 1956 |

FOREIGN PATENTS

| | | |
|---|---|---|
| 742,517 | Great Britain | Dec. 30, 1955 |
| 749,729 | Great Britain | May 30, 1956 |